April 5, 1932.  E. G. BOYER  1,852,601
EXPANDING INTERNAL MILLING MACHINE
Filed Feb. 19, 1930  3 Sheets-Sheet 1
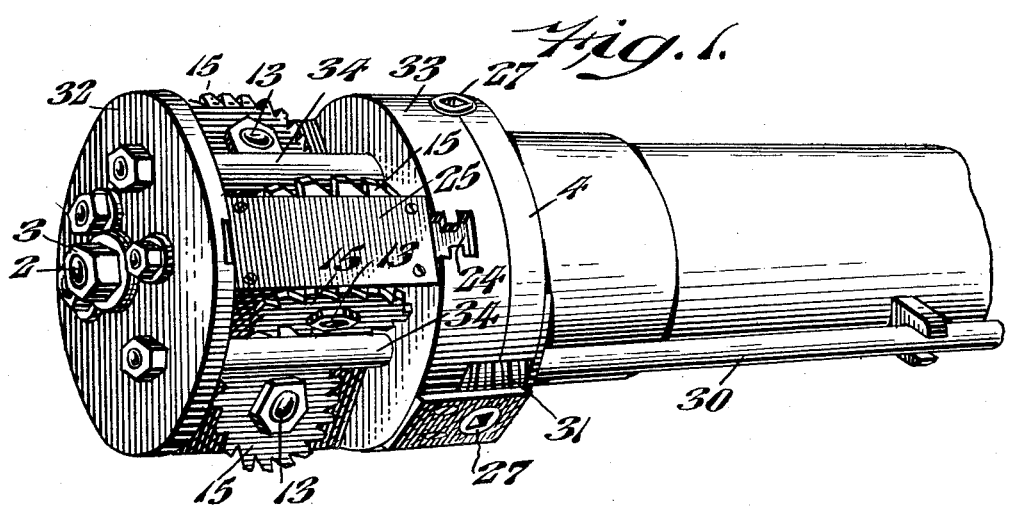
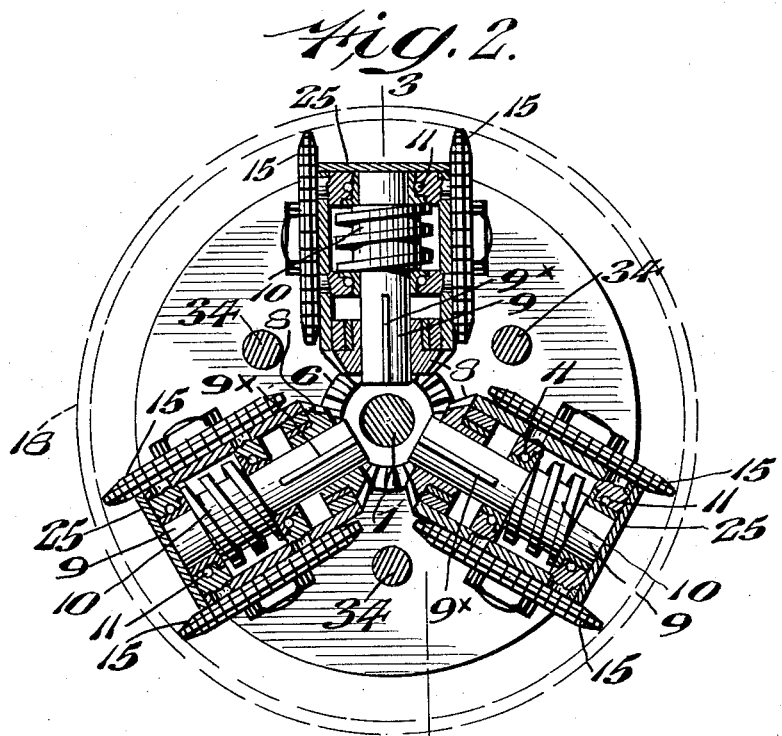
INVENTOR.
EARLE G. BOYER,
BY Louis Necho
ATTORNEY

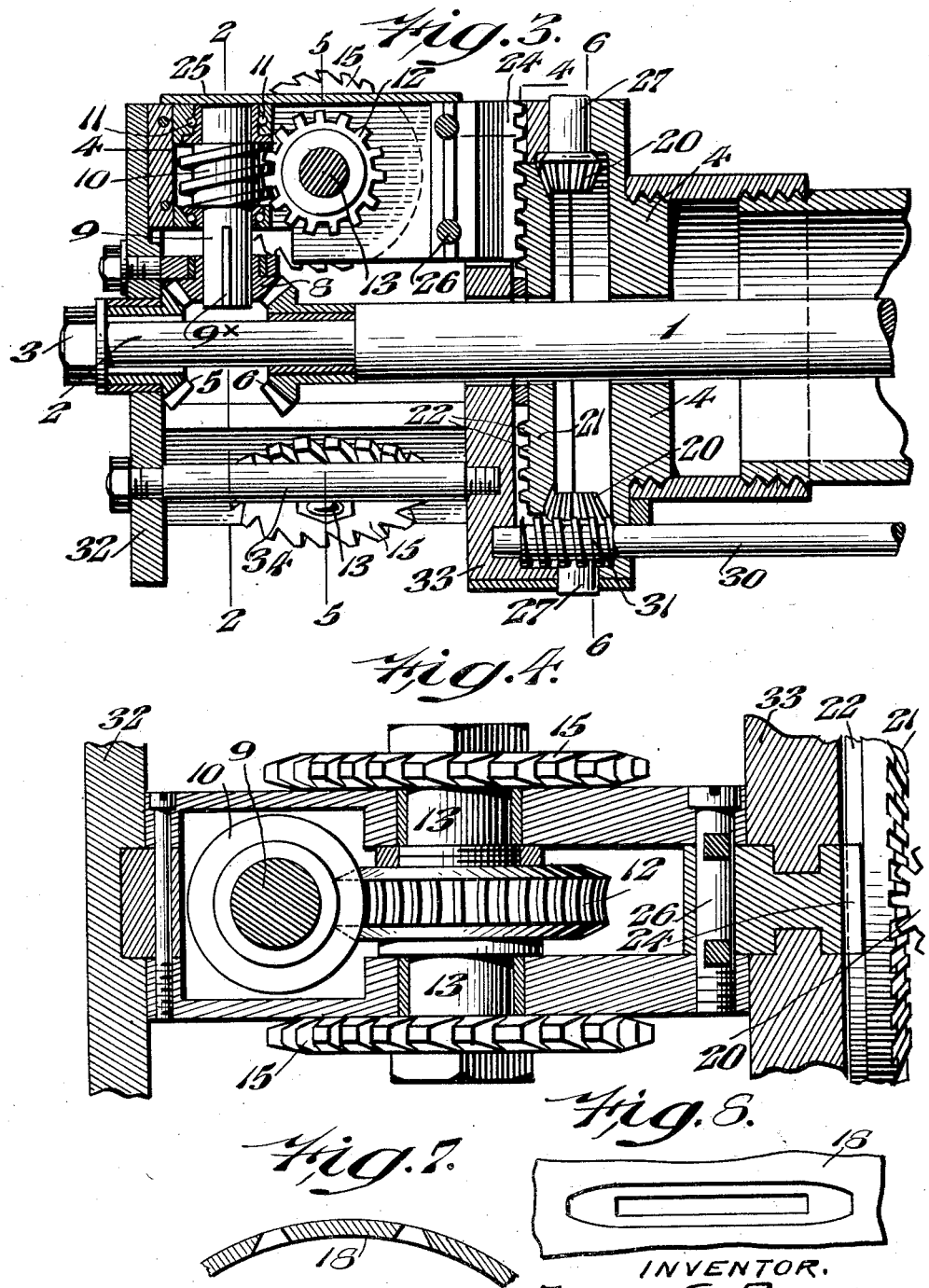

April 5, 1932.  E. G. BOYER  1,852,601
EXPANDING INTERNAL MILLING MACHINE
Filed Feb. 19, 1930   3 Sheets-Sheet 3
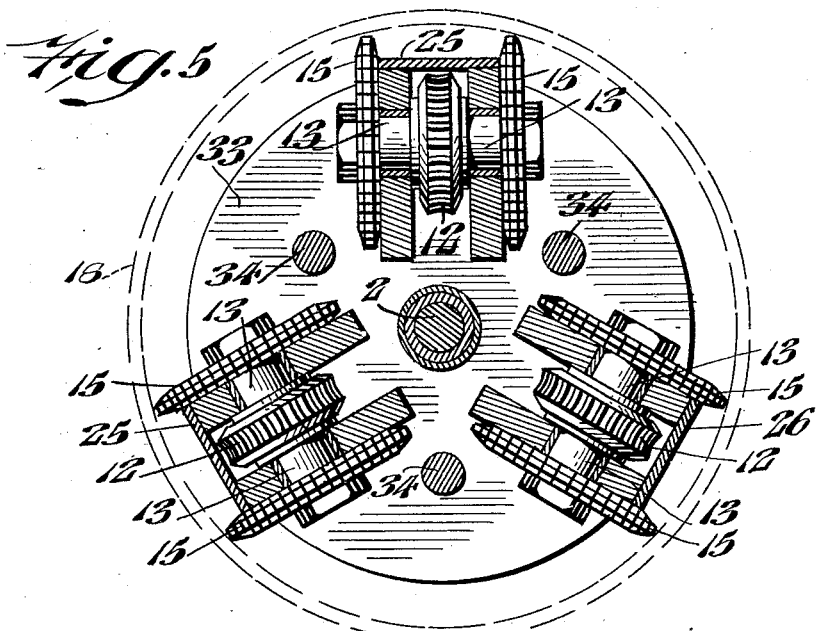
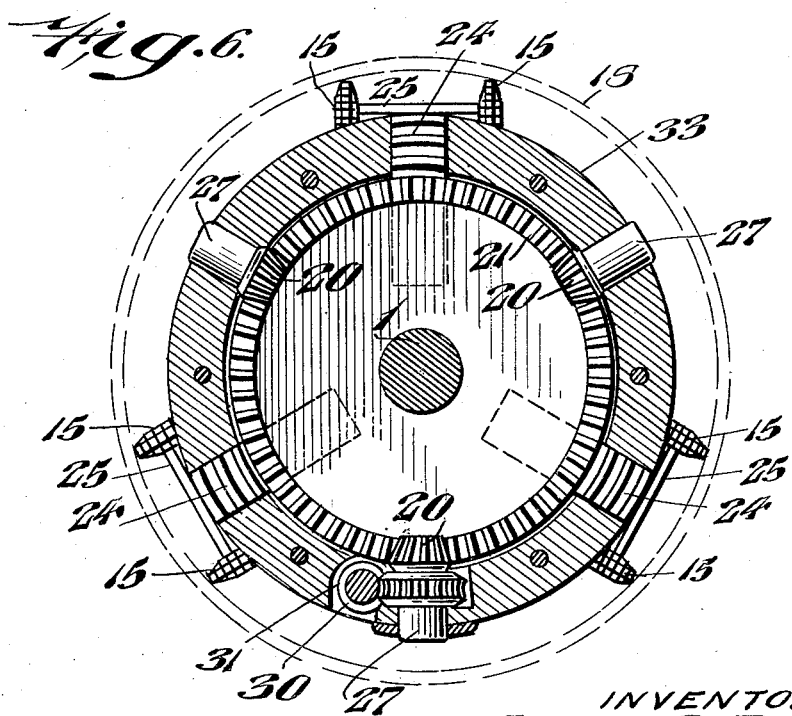
INVENTOR.
EARLE G. BOYER.
BY Louis Necho
ATTORNEY Patented Apr. 5, 1932

1,852,601

UNITED STATES PATENT OFFICE

EARLE G. BOYER, OF PHILADELPHIA, PENNSYLVANIA

EXPANDING INTERNAL MILLING MACHINE

Application filed February 19, 1930. Serial No. 429,487.

My invention relates to an expanding internal milling machine of the type particularly adapted for cutting a plurality of longitudinal, staggered, outwardly tapering slots in a pipe to form a strainer for use in wells.

As is well known, it is desirable that pipe strainers for wells should have longitudinal, preferably staggered, and necessarily outwardly tapering slots therein so as to permit maximum flow of water or other fluid without clogging of the slots.

It is therefore the object of my invention to produce a novel expanding internal milling machine whereby pipe strainers of any desired length may be cut or slotted efficiently, economically, and exeditiously, from the inside of the pipe being cut, and whereby the slots thus produced are of an outwardly tapering character and extend longitudinally of the pipe.

A further object of the invention is to produce a milling device of this general character which will cut a plurality of longitudinal, outwardly tapering slots simultaneously and in any desired arrangement.

A still further object of my invention is to produce a novel expanding internal milling machine which can be operated at a distance regardless of the length of the pipe being slotted, and whereby slotted pipe strainers in lengths not heretofore obtainable may be produced by a single continuous operation and without any necessity of transversely cutting the pipe being slotted into smaller sections, which after being internally slotted by machines heretofore known and used are subsequently joined together to form the necessary length.
To the above ends, my invention consists of a shaft of any desired length, means for driving said shaft, a driving gear carried by the front free end of the shaft, a plurality of jaws or frame members carried by the front end of said shaft, sets of cutters carried by said jaws, driving connections from said shaft to said cutters, means for actuating said jaws and cutters radially towards and away from said shaft, and driving connections for said last mentioned means extending longitudinally of said shaft.

My invention further consists of the various novel features of construction and advantage which are illustrated in the annexed drawings and which are hereinafter described and finally claimed.

In the accompanying drawings:

Fig. 1 represents a perspective view of an expanding internal milling machine embodying my invention.

Fig. 2 represents a section on line 2—2 of Fig. 3.

Fig. 3 represents a section on line 3—3 of Fig. 2.

Fig. 4 represents a section on line 4—4 of Fig. 3.

Fig. 5 represents a section on line 5—5 of Fig. 3.

Fig. 6 represents a section on line 6—6 of Fig 3.

Fig. 7 represents a fragmentary cross-sectional view of a pipe slotted by means of the machine shown in Fig. 1.

Fig. 8 represents the inside plan view of Fig. 7.

For the purpose of illustrating my invention I have shown in the accompanying drawings one form thereof which is at present preferred by me, since the same has been found in practice to give satisfactory and reliable results, although it is to be understood that the various instrumentalities of which my invention consists can be variously arranged and organized and that my invention is not limited to the precise arrangement and organization of the instrumentalities as herein shown and described.

Referring to the drawings, in which similar numerals of reference indicate corresponding parts, and referring particularly to Fig. 3, 1 designates a shaft having the front reduced portion 2, which is retained by the nut 3, said shaft being journalled in suitable bearings 4 and driven by any suitable means not shown. The reduced portion 2 of the shaft 1 carries the front fast cog wheel or gear 5, and the rear loose cog wheel or gear 6. The fast cog wheel 5 is in mesh with or engages the cog wheel or gear 8 on the vertical shaft 9 to revolve the latter when the shaft 1 is driven or revolved. The cog wheel 8 is loose on the shaft 9 and is keyed thereto as at 9x, thereby serving to rotate the shaft 9 without preventing the vertical displacement thereof. The shaft 9 is provided with the worm 10 which engages the gear 12 fast on the transverse shaft 13 to revolve the latter. The shaft 13 carries a pair of parallel, spaced, bevelled cutters 15 which are revolved by the rotation of the shaft 9 which in turn is actuated by the rotation of the shaft 1. The shaft 9 is provided with anti-friction means 11, best seen in Fig. 3.

By reference to Figs. 1, 2, 5, and 6, it will be seen that I employ three shafts "13" each carrying a pair of parallel, spaced, bevelled cutters "15", each of said shafts "13" being actuated by a corresponding shaft "9" having a worm "10" which engages a gear "12", and a gear "8" which engages the driving gear 5 on the front end of the shaft 1, so that six cutters are simultaneously actuated from the single shaft 1.

While I have shown three pairs of cutters and the means to actuate the same simultaneously, it is to be understood that the number of cutters may be increased or decreased as desired.

In order to bring the cutters 15 into gradual effective contact with the inside surface of the pipe 18 (see Figs. 5, 6, 7, and 8) to be slotted, I provide the bevelled pinions 20 (preferably three in number) which engage the cog wheel 21, which is loose on the shaft 1. The cog wheel 21 is provided on the opposite face thereof with the spiral rib 22 which engages the toothed racks 24. Each rack "24" is carried by or forms part of the frame or jaw "25", which carries a shaft 9, a shaft 13, a pair of cutters 15, and their adjuncts so that by rotation of the pinions 20 (or any of them) and the rotation of the cog wheel 21, the various pairs of cutters 15 are actuated radially with respect to the shaft 1. To facilitate the radial displacement of the jaws or frames 25, I provide suitable anti-friction means 26, best seen in Fig. 3. The pinions 20 may be actuated by any suitable socket wrench engaging the stems 27 thereof, as will be understood from Fig. 1.

In order to actuate the cutters 15, when the cutting machine has advanced considerably within a relatively long pipe 18, and the stems 27 of the pinions 20 are no longer accessible for manual operation, I provide the shaft 30, which carries the worm 31 which engages one of the pinions 20, whereby the cog wheel 21 may be revolved to actuate the racks 24 radially towards or away from the shaft 1. The shaft 30 may be manually operated at its rear or outer end, or it may be geared to the shaft 1 or to any other driving means or connection. To insure lateral alignment of the cutters 15 I provide the cog wheel 6 which is loose on the reduced portion 2 of the shaft 1 and which engages the cogs or gears "8" loose on the bottom of the shafts "9", thereby preventing the lateral displacement of the shafts "9" and their adjuncts.

In Figs. 6 and 7 I have shown samples of a pipe 18 slotted by a machine embodying my invention, illustrating the outwardly tapering character of the slots formed by the cutters 15, it being understood that the length, arrangement, and number of slots in any given length of pipe may be varied at will without departing from the spirit or scope of the invention.

The expansible or radially movable cutters 15, together with their movable supports, driving means and other adjuncts, are enclosed or assembled between front and rear plates 32 and 33 which are engaged by the bolts 34, as will be understood from the drawings.

The operation is as follows:

With the cutters 15 in their innermost positions, that is, when the cutters are nearest to the reduced portion 2 of the shaft 1, the entire milling machine is inserted into the pipe 18 to be slotted. The shaft 1 is then revolved to revolve the cutters 15 and the pinions 20 are manipulated by the shaft 30 or manually by a socket wrench to raise or move the cutters 15 radially away from the longitudinal median line of the milling machine, thereby bringing the edges of the cutters into effective contact with the surface of the pipe 18. As the cutting progresses, the pinions 20 are gradually turned further to raise the cutters 15 until a through slot of the desired dimensions has been cut in the pipe. The pinions 20 are then turned in the reverse direction to withdraw or retract the cutters 15 until they clear the inside surface of the pipe 18, whereupon the milling machine is turned around, advanced, or retarded to cut additional slots 31 at any desired point in the surface of the pipe.

Having thus described my invention, what I claim as new, and desire to secure by Letters Patent, is:

An internal pipe milling machine for cutting outwardly tapering longitudinal slots, comprising a main driving shaft adapted to extend within the pipe to be slotted, a plurality of intermediate shafts disposed radially with respect to said main driving shaft, driving connections intermediate said main driving shaft and said intermediate shafts for revolving the latter, a plurality of corresponding driven shafts disposed transversely of said intermediate shafts and said main driving shaft, means operatively connecting said intermediate and said driven shafts for actuating the latter, cutters carried by said driven shaft transversely thereof, and means for radially moving said cutters towards and away from said main driving shaft.

In testimony whereof I affix my signature.

EARLE G. BOYER.